(12) United States Patent  (10) Patent No.: US 9,213,424 B1
Dunn  (45) Date of Patent: Dec. 15, 2015

(54) STYLUS DEVICES WITH ERASER

(71) Applicant: Amazon Technologies, Inc., Reno, NV (US)

(72) Inventor: Christopher Lorenzo Dunn, Los Gatos, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 66 days.

(21) Appl. No.: 14/034,138

(22) Filed: Sep. 23, 2013

(51) Int. Cl.
*G09G 5/00* (2006.01)
*G06F 3/0354* (2013.01)

(52) U.S. Cl.
CPC ................................. *G06F 3/03545* (2013.01)

(58) Field of Classification Search
CPC ... G06F 3/03545; G06F 3/0386; G06F 3/041; G06F 3/0414; G06F 3/0412; G06F 3/0416; G06F 3/04883
USPC .................. 345/179; 178/19.01, 19.03, 20.01
See application file for complete search history.

(56) References Cited

U.S. PATENT DOCUMENTS

| 8,493,359 B2 * | 7/2013 | Wright et al. .................. 345/174 |
| 2012/0293425 A1 * | 11/2012 | Lee et al. ...................... 345/173 |
| 2013/0127792 A1 * | 5/2013 | Chang et al. .................. 345/179 |
| 2013/0300693 A1 * | 11/2013 | Keda et al. ..................... 345/173 |

* cited by examiner

*Primary Examiner* — Jennifer Nguyen
(74) *Attorney, Agent, or Firm* — Seyfarth Shaw LLP; Ilan N. Barzilay; Joseph M. Walker (57) ABSTRACT

A stylus device including a first end or active end for writing and interacting with a touchscreen of a computing device, and a second end or passive end for using an erase function with the touchscreen of the computing device. This allows a user to write or interact with a computing device with one end of the stylus device and simply turn the stylus device over and erase without having to select an eraser function from a menu on the computing device. In this manner, the stylus device provides a more traditional method of writing and erasing, similar to that of traditional pencils.

18 Claims, 8 Drawing Sheets

STYLUS DEVICES WITH ERASER

BACKGROUND

With the advancement of technology, the use and popularity of electronic devices, such as mobile devices, has increased considerably. Mobile devices, such as smart phones and tablet computers, typically have touch screens that enable a user to operate the devices by touching the screen with a finger or stylus type device. Stylus devices can mimic the use of familiar writing tools, such as pens and pencils. However, most stylus devices require a user to select an eraser function from a menu in order to erase using the stylus.

BRIEF DESCRIPTION OF DRAWINGS

For a more complete understanding of the present disclosure, reference is now made to the following description taken in conjunction with the accompanying drawings.

FIGS. 4A-6 illustrate perspective views of prior art stylus devices.

DETAILED DESCRIPTION

In one aspect, the present disclosure is directed to stylus devices including an eraser for use with touchscreens of computing devices, for example, such as desktop computers, telephone computing devices/smart phones, laptop computers, personal digital assistants (PDAs), tablet computers, electronic readers and other devices. Writing and drawing programs on tablets typically have an eraser function. While this function can typically be activated by selecting it from an on-screen palette or menu, it may be more natural and convenient to erase by turning the stylus upside down and using an end opposite the writing tip as an eraser. This provides a stylus function more like the traditional pencils that users are familiar with.

In an aspect, stylus devices are disclosed that include a writing end and an eraser end. This allows a user to write or interact with a computing device with one end of the stylus and simply turn the stylus over and erase without having to select an eraser function from a menu. In this manner, the stylus devices disclosed herein provide a more traditional method of writing and erasing, similar to that of traditional pencils. In one aspect, the disclosed stylus devices include a writing end in the form of an active stylus tip and an eraser end in the form of a passive stylus tip. In this aspect, the stylus devices include circuitry, which may include a power supply, that identifies which end is being used and communicates this information to the computing device being used in conjunction with the stylus. This allows the computing device to switch between a writing function and an erase function without the user having to select the functions from a menu on the computing device.

As used herein, an active tip means a tip that detects its position in relation to the computing device (such as the X-Y coordinate position of the tip on the touchscreen of the device). The stylus may then communicate that position to the computing device. As used herein, a passive tip or passive tip mean a tip that does not detect its position in relation to the computing device. In an aspect, a touchscreen of the computing device generates a signal (such as a signal from a digitizer grid), and the active tip receives, and may amplify, the signal. The active tip includes components to detect the tip position relative to the touchscreen using the signal. The stylus may then communicate position information to the computing device by transmitting the received signal, or another message based on the received signal, back to the computing device. The components for transmitting the position information may be located in the active tip. The signal may also contain other information in addition to the position information, such as a pressure of contact between the active tip and the computing device, an angle of orientation of the stylus, etc. The passive tip does not communicate position information with the computing device. Rather the passive tip interacts with and alters the signal generated by the computing device, and the computing device identifies the location of the stylus based on this alteration/interaction, much in the same way a finger or other object interacts with and alters the signal generated by the computing device. Each of the active tip and passive tip has a capacitance associated with it. The capacitance may be different for each tip. The respective capacitance may be used by the stylus to measure interactions with the computing device (by detecting a charge associated with contact between the stylus and computing device). The measured interactions may be different depending on which tip is in contact with the computing device. For example, contact between the active tip and the computing device may result in a first conductance, wherein the first conductance differs from a second conductance that results from contact between the passive tip and the computing device.

Figure 1:
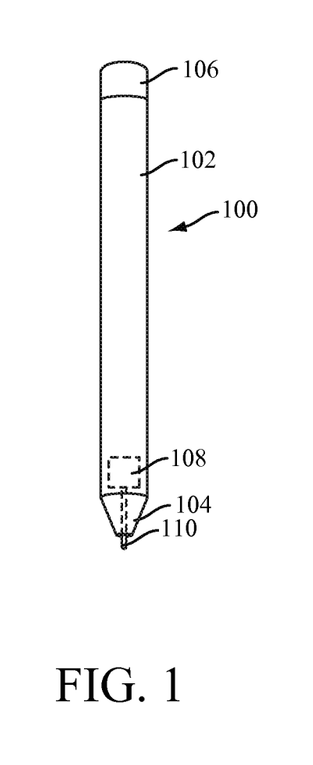
FIGS. 1-3 illustrate perspective views of a stylus device according to one aspect of the present disclosure.
Figure 2:
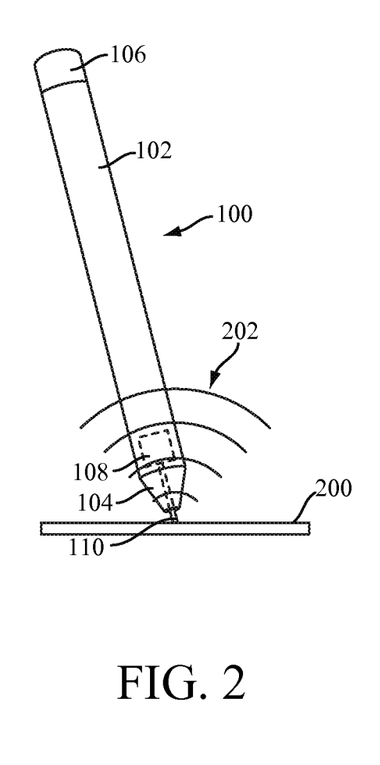
Figure 3:
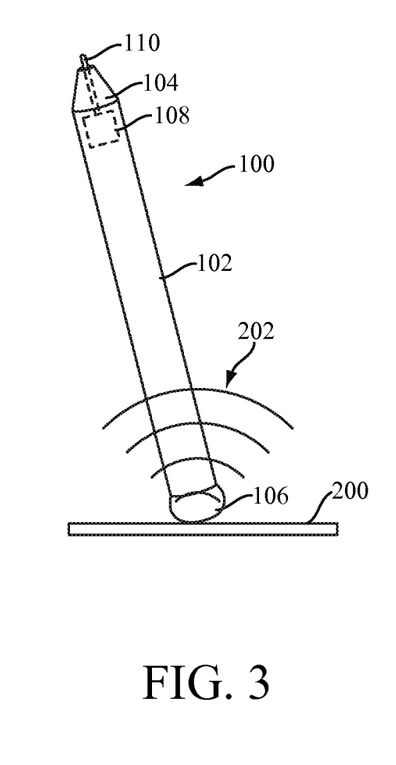

FIGS. 1-3 illustrate an exemplary stylus device of the present disclosure. A stylus 100 includes a body or shaft 102 for a user to grip when using the stylus device 100, a first end or active end 104 at a first end of the shaft 102 for writing and interacting with a touchscreen of a computing device 200, and a second end or passive end 106 at a second end of the shaft 102 for using an erase function with the touchscreen of the computing device 200. In an aspect, the first end 104 is an active type stylus. In this aspect, the first end 104 includes circuitry including an active sensor 108, as known in the art, located near and in electrical communication with a tip 110. The first end communicates with the computing device 200 and uses the computing device's 200 touchscreen to sense location and achieves high accuracy using the active sensor 108 located near the tip 110 of the stylus.

In an aspect, the touchscreen of the computing device 200 generates a signal 202 that the first end 104 of the stylus 100 interacts with. The signal may be generated by the touchscreen or another component of the computing device 200 such as a digitizer grid. The first end 104 may include circuitry to determine X-Y location information from the touchscreen of the computing device 200 and send or transmit the X-Y locations to the computing device 200. The circuitry may be part of the active sensor 108, or may be a separate component. The circuitry may determine the X-Y locations by detecting changes in electrical capacitance, which occur when the first end 104 of the stylus 100 is in close proximity to or touching the touchscreen of the computing device 200. The circuitry may determine the X-Y coordinates from the signal received from the computing device as detected by the active sensor 108. The circuitry may transmit the X-Y coordinates, or other position or orientation information (such as the orientation of the stylus as determined by other components such as orientation switch, etc.), to the computing device. The X-Y coordinates may be transmitted to the computing device in the same message as an indication that the stylus is in a writing mode.

The second end 106 may be a passive tip. In an aspect, the shaft 102 and the second end 106 are constructed of a conductive material. For example, the shaft 102 may be constructed of a conductive rubber, metal, polymer, or other conductive material, and the second end 106 may be constructed of a conductive rubber or foam. The conductive material allows electrical impulses to be transferred through the shaft 102 and the second end 106. This allows the second end 106 to interact with the touchscreen of the computing device 200 passively, that is without actually communicating with the computing device 200, for example mimicking a finger.

The second end 106 may be rigid or pliable to deform upon application of pressure. As illustrated in FIG. 3, when the eraser function is being used, the second end 106 deforms upon pressing of the second end 106 on the touchscreen of the computing device 200. This allows for a greater surface area contact between the touchscreen of the computing device 200 and the stylus, and serves to protect the touchscreen of the computing device 200 from being scratched or otherwise damaged by use of the second end 106.

In one aspect, the circuitry, which may be included in the circuitry of the active sensor 108 or may be separate circuitry, may also be used to identify which end is being used and communicate use mode (i.e., writing or erasing) information to the computing device to allow the computing device to switch between a writing function and an erase function without the user having to select the functions from a menu on the computing device. In other aspects, other technologies may be used to communicate which mode the stylus is in, for example, an antenna (which may be proximate to the writing end, proximate to the eraser end, or located elsewhere in the stylus), a pressure activated switch under the eraser element of the eraser end, an orientation switch to detect when the stylus is turned upside down, an optical source that emits light through an aperture in the eraser element and detected by the computing device, an audio signal emitted from the eraser element and detected by the computing device, and other technologies.

Figure 4A:
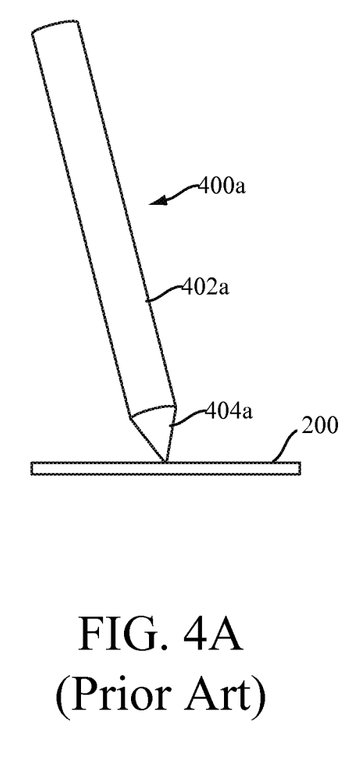
Figure 4B:
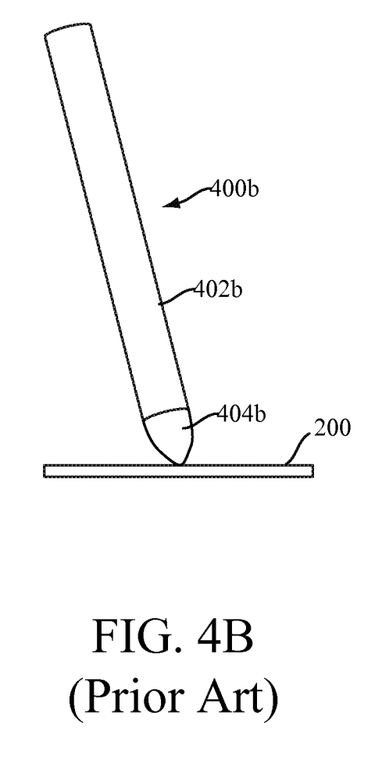

In general, there are a few types of stylus designs on the market today. FIG. 4A illustrates a resistive type stylus design 400a. The resistive type stylus 400a includes a stylus body 402a and a tip 404a. The stylus 400a may be used in conjunction with a resistive type touchscreen of the computing device 200, in which the touchscreen response to pressure being applied by the stylus 400a. FIG. 4B illustrates a passive type stylus design 400b. This type of stylus design 400b is constructed with a conductive stylus body 402b and a conductive rubber tip 404b. The tip 404b interacts with the touchscreen of the computing device 200, as known in the art.

Figure 5A:
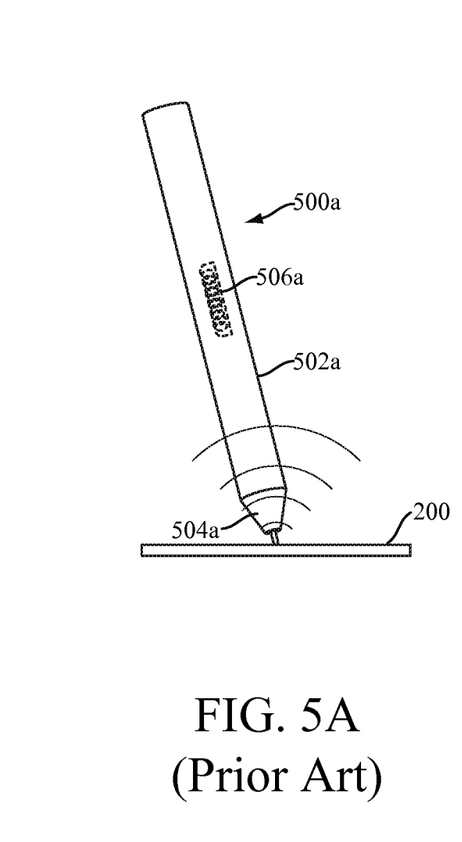

FIG. 5A illustrates an electromagnetic type stylus 500a. This type of stylus design 500a includes a stylus body 502a, a tip 504a, and a coil 506a near a midpoint of the body 502a. The stylus 500a works in conjunction with a computing device 200 having an electromagnetic digitizer grid located below the display to sense location. The stylus 500a generates a signal that is detected by the grid of the computing device. This type of stylus 500a can be very accurate but the need for a separate digitizer grid adds cost to the tablet.

Figure 5B:
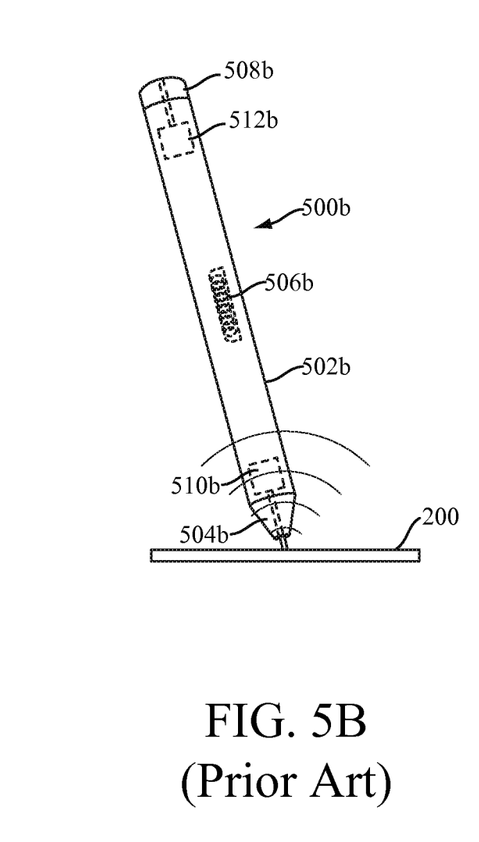

A similar type of stylus 500b, a stylus device by Wacom, is illustrated in FIG. 5B. The Wacom device 500b is also an electromagnetic type stylus that uses magnetic fields and a coil 506b typically positioned near a midpoint of the stylus body 502b. This stylus has two ends 504b and 508b, one for writing and one for erasing. The Wacom device 500b senses the stylus position, i.e., whether the stylus has the writing tip 504b facing the touchscreen or the eraser end 508b facing the touchscreen, using two switches. One switch 510b is at the tip 504b at the writing end that engages when writing, and the other switch 512b is at the tip 508b at the eraser end that engages when erasing. However, this type of stylus can be expensive and the tablet the stylus is being used with requires a specialized digitizer grid.

Figure 6:
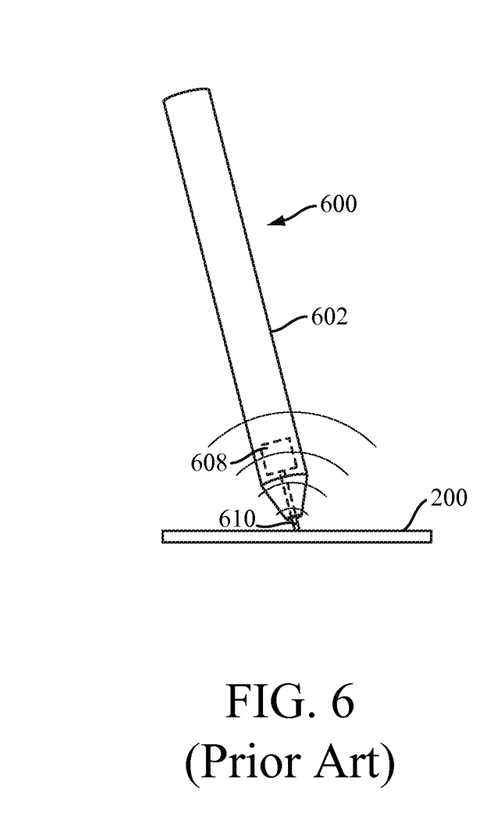

FIG. 6 illustrates an active type stylus 600. This type of stylus design 600 includes a stylus body 602 and an active sensor 608, as known in the art, located near and in electrical communication with a tip 610. This uses the touchscreen of the computing device 200 to sense location but achieves high accuracy by means of the active sensor 608.

These prior art stylus devices only have one functional end for interacting with the touchscreen of the computing device 200. In order for a user to use an erase function with these stylus devices, the user must activate the eraser function by selecting it from an on-screen palette or menu, which can be inconvenient. The stylus designs of the present disclosure have two functional ends, one for writing and interacting with the computing device, and another for using an erase function.

The stylus devices of the present technology avoid the drawbacks of the prior art devices by including a writing end in the form of an active stylus tip and an eraser end in the form of a passive stylus tip. The stylus devices may also include circuitry, which may be part of or separate from the circuitry of the active tip, that communicates to the computing device which end is being used.

Figure 7:
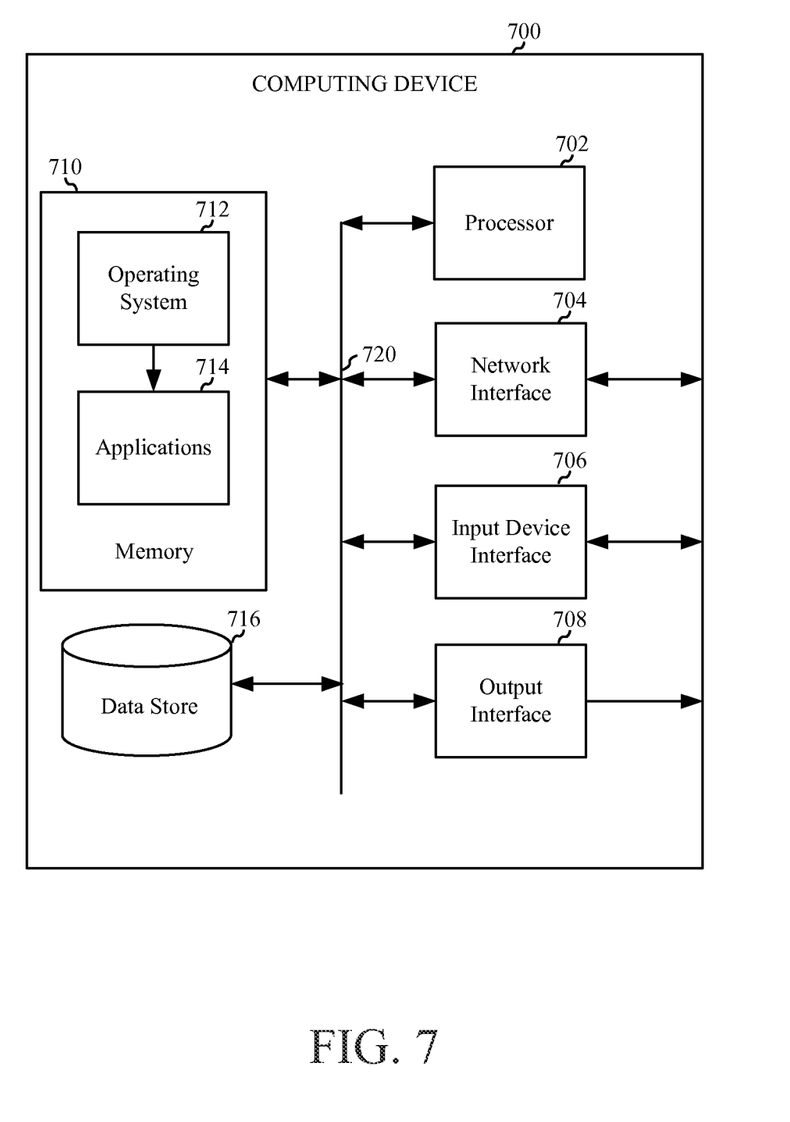
FIG. 7 illustrates an exemplary computing device according to an aspect of the present disclosure.

Aspects of the present disclosure may be implemented as a computer implemented method in a computing device or computer system. For example, the function of each end of the ends of the stylus devices may be implemented in the computing device. These computing devices may include, but are not limited to, mobile phones, laptop computers, tablet computers, personal computers, workstations, mini- and mainframe computers, servers, and the like. These computing devices may also include specially configured computers for implementing the functions of the separate ends of the stylus devices. The general architecture of a suitable computing device is described below with reference to FIG. 7. More particularly, FIG. 7 is a block diagram illustrating exemplary components of a computing device 700, which may be the computing device 200, suitable for use with the stylus devices. However, the following description of the exemplary components of a computing device 700 should be viewed as illustrative only and not construed as limiting in any manner.

With regard to FIG. 7, the exemplary computing device 700 may include a processor 702 in communication with a variety of other components over a system bus 720 or through a direct connection. These other components may include, by way of example, a network interface 704, an input device interface 706, an output interface 708, and a memory 710. As appreciated by those skilled in the art, the network interface 704 enables the computing device 700 to communicate data, control messages, data requests, and other information with other resources including computers, data sources, storage devices, and the like, on a computer network such as the Internet. The network interface 704 may be configured to communicate via wired or wireless connections.

The input device interface 706, sometimes also embodied as an input/output interface, enables the computing device 700 to obtain data input from a variety of devices including, but not limited to, a microphone, a stylus device, a touchscreen, a keyboard, a mouse, a scanner, and the like. In addition to the exemplary components described above, an output interface 708 may be used for outputting information such as audio signals or display information. Display information may be output by the output interface 708 via a display device (e.g., a monitor, touchscreen display or similar device, not shown), for example.

The processor 702 may be configured to operate in accordance with programming instructions stored in a memory 710. The memory 710 generally comprises RAM, ROM, and/or other memory. Thus, in addition to storage in read/write memory (RAM), programming instructions may also be embodied in read-only format, such as those found in ROM or other permanent memory. The memory 710 may store an operating system 712 for controlling the operation of the computing device 700. The operating system may be a general purpose operating system such as a Microsoft Windows operating system, a UNIX operating system, a Linux operating system, or an operating system specifically written for and tailored to the computing device 700. Similarly, the memory 710 may also store user-executable applications 714, or programs, for conducting various functions on the computing device 700. For example, the application 714 in memory 710 may be configured according to aspects of the present disclosure to detect whether the stylus device is in an erase mode and operate the computing device 700 according to the various functions of the different ends of the stylus devices. The computing device 700 also optionally includes a data store 716 to store data on the computing device 700.

As described above, the touchscreen of the computing device may receive or obtain information from the stylus devices corresponding to whether the stylus is being used in an eraser mode, or calculate/determine position information of the stylus by treating the eraser end as a passive stylus when the stylus is in eraser mode. The stylus can communicate to the computing device that the stylus is in eraser mode using a variety of technologies. However, the computing device may also detect that the stylus is in erase mode using any of the technologies disclosed herein.

For example, as illustrated in FIGS. 1-3, the active end 104 (non-eraser end) of the stylus is in close proximity to the touchscreen of the computing device 200 and communicates X-Y location information when the active end 104 is being used. However, the active end 104 can be in communication with the touchscreen of the computing device 200 at a greater distance and can be used to communicate that the stylus 100 is in eraser mode when the active end 104 is positioned away from the touchscreen.

In this aspect, when the active end 104 is in close proximity to the touchscreen of the computing device 200, the stylus 100 communicates that the stylus 100 is not in eraser mode. However, when the active end 104 is further away and the eraser end 106 is in close proximity to the touchscreen of the computing device 200, the stylus 100 can communicate to the computing device 200 that the stylus 100 is in eraser mode.

In an aspect, a measure of a change in conductance of the eraser element on the eraser end 106 can be used to determine when the stylus 100 is in eraser mode. For example, as illustrated in FIG. 3, the eraser end 106 may be pliable and deform when pressed against the touchscreen of the computing device 200. This deformation increases the surface area of contact between the eraser end 106 of the stylus 100 and the touchscreen of the computing device 200. This increase in surface area results in an increase in conductance. As pressure on the eraser end 106 increases so does the conductance. This increase in conductance can be measured by the stylus 100, for example, the active end 104, or the computing device 200 and used to identify that the stylus 100 is in eraser mode.

The eraser end 106 may also be constructed of a material having its own conductive fingerprint. That is, the conductance resulting from contact between the eraser end and the computing device 200 differs from the conductance resulting from contact between the computing device 200 and the active end 104 (or finger, etc.). In this aspect, the stylus 100, for example, the active end 104, or the computing device 200 can detect the conductance and identify when the stylus 100 is in eraser mode based on the conductive fingerprint of the eraser end 106.

Other technologies can also be used to communicate that the stylus is in eraser mode, for example, an antenna proximate to the eraser end, a pressure activated switch under the eraser element of the eraser end, an orientation switch to detect when the stylus is turned upside down, an optical sensor that emits light through an aperture in the eraser element and detected by the computing device, an audio signal emitted from the eraser element and detected by the computing device, and other technologies.

Figure 8:
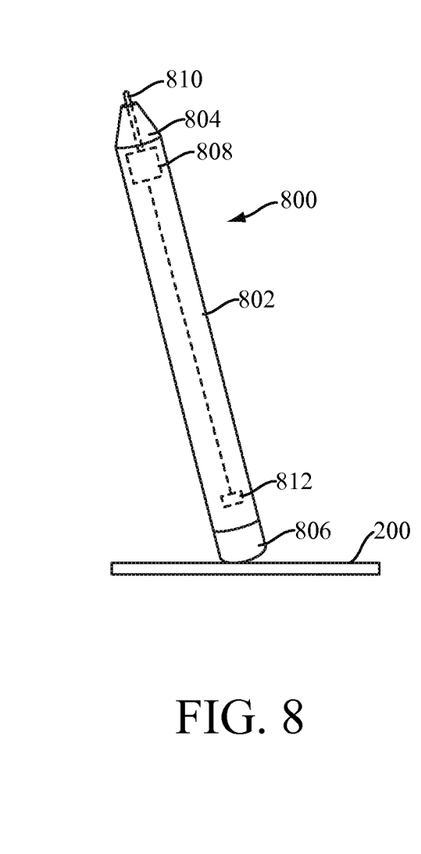
FIGS. 8-13 illustrate perspective views of other stylus devices according to aspects of the present disclosure.

FIG. 8 illustrates a stylus 800 according to an aspect of the disclosure. In this aspect, the stylus 800 includes a body or shaft 802 for a user to grip when using the stylus device 800, an active end 804 at a first end of the shaft 802 for writing and interacting with a touchscreen of a computing device 800, and an eraser end 806 at a second end of the shaft 802 for using an erase function with the touchscreen of the computing device 200. The active end 804 may be an active type stylus and include an active sensor 808 in electrical communication with a tip 810.

In this aspect, the stylus 800 includes circuitry including the active sensor 808 and an antenna 812 proximate to the eraser end 806 that is in electrical communication with the sensor 808. The circuitry/sensor 808 has two inputs, one from the tip 810 and one from the antenna 812. When the tip 810 is in contact with or proximate to the touchscreen of the computing device 200, the signal from the tip 810 is stronger, and when the eraser end 806 is in contact with or proximate to the touchscreen of the computing device 200, the signal from the antenna 812 is stronger. This allows the stylus 800 to identify which end of the stylus 800 is being used and communicate whether the stylus 800 is in an active mode or an eraser mode to the computing device 200. In other aspects, the computing device 200 detects and identifies the mode of the stylus 800.

Figure 9:
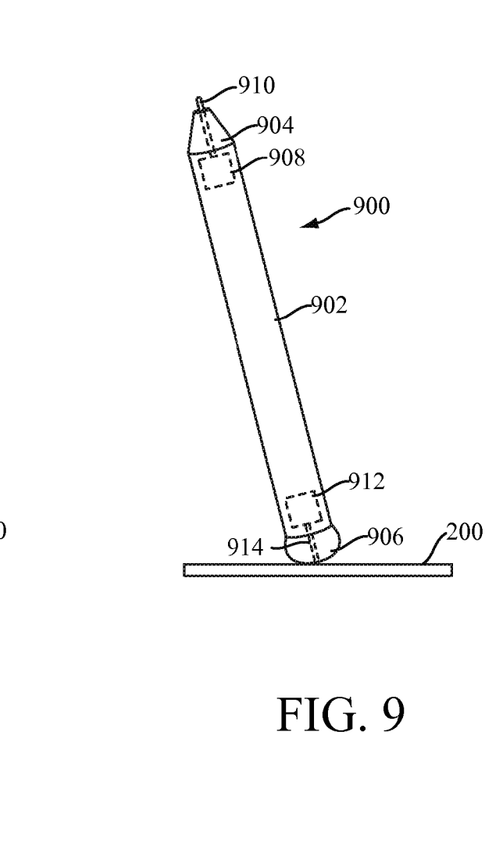

FIG. 9 illustrates a stylus 900 according to an aspect of the disclosure. In this aspect, the stylus 900 includes a body or shaft 902, an active end 904, and an eraser end 906. The active end 904 may be an active type stylus and include an active sensor 908 in electrical communication with a tip 910. In this aspect, the stylus 900 also includes circuitry including a pressure sensitive switch 912 with an activation member 914 in the eraser end 906. When the eraser end 906 of the stylus is being used, pressure placed on the eraser end 906 activates the switch 912 and causes the stylus 900 to communicate to the computing device 200 that the stylus 900 is in an erase mode.

Figure 10:
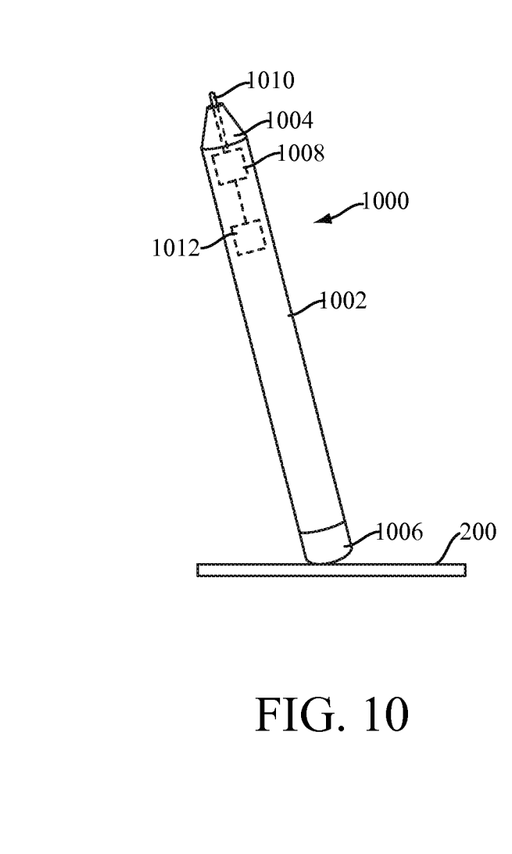

FIG. 10 illustrates a stylus 1000 according to an aspect of the disclosure. In this aspect, the stylus 1000 includes a body or shaft 1002, an active end 1004, and an eraser end 1006. The active end 1004 may be an active type stylus and include an active sensor 1008 in electrical communication with a tip 1010. In this aspect, the stylus 1000 includes circuitry including an orientation sensor and switch 1012. The sensor and switch 1012 may include an inertial sensor, a gravity switch, or other element capable of detecting orientation. In this aspect, the sensor and switch 1012 identify the orientation of the stylus 1000 and the active sensor 1008 communicates the orientation of the stylus 1000 to the computing device 200. For example, when the active end 1004 is proximate the computing device 200, the stylus 1000 communicates that it is in active mode, and when the eraser end 1006 is proximate the computing device 200, the stylus 1000 communicates that it is in erase mode.

Figure 11:
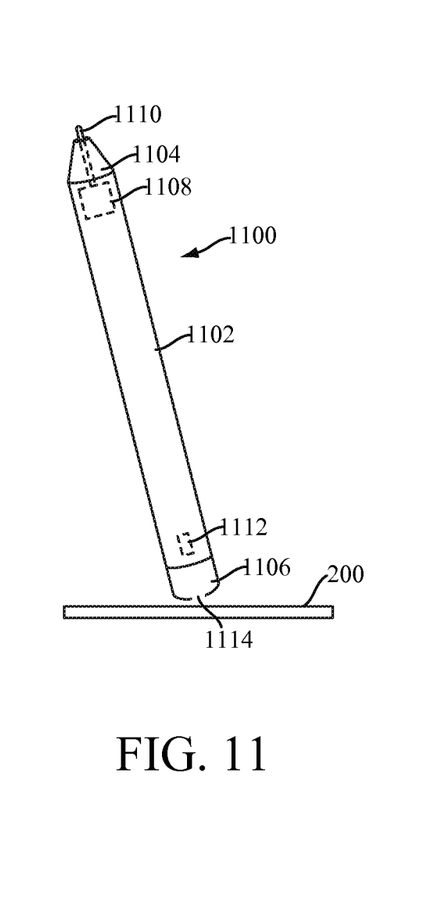

FIG. 11 illustrates a stylus 1100 according to an aspect of the disclosure. In this aspect, the stylus 1100 includes a body or shaft 1102, an active end 1104, and an eraser end 1106. The active end 1104 may be an active type stylus and include an active sensor 1108 in electrical communication with a tip 1110. In this aspect, the stylus 1100 includes circuitry including an optical sensor 1112 that detects light through an aperture 1114 in the eraser end 1106 of the stylus 1100.

When light emitted by the touchscreen of the computing device 200 is detected by the optical sensor 1112, the stylus 1100, for example, the active sensor 1108, communicates to the computing device 200 that the stylus 1100 is in eraser mode. Alternatively, when the eraser end 1106 is pliable, the sensor 1112 may be blocked when the eraser end 1106 is deformed. In this aspect, the sensor 1112 may be adapted to detect ambient light and identify a lack of ambient light when the eraser end 1106 is proximate to the touchscreen of the computing device 200. In this aspect, the stylus 1100 communicates that it is in erase mode when the there is a lack of ambient light.

Figure 12:
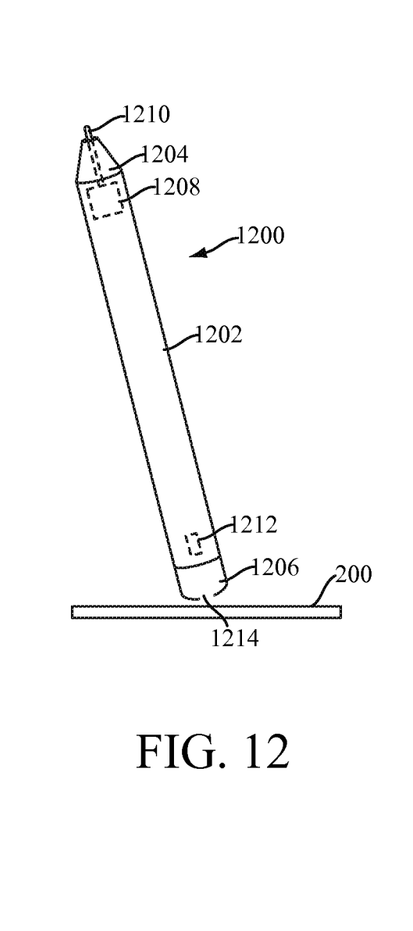

FIG. 12 illustrates a stylus 1200 according to an aspect of the disclosure. In this aspect, the stylus 1200 includes a body or shaft 1202, an active end 1204, and an eraser end 1206. The active end 1204 may be an active type stylus and include an active sensor 1208 in electrical communication with a tip 1210. In this aspect, the stylus 1200 includes circuitry including an audio or light emitting element 1212, such as an infrared (IR) light emitting diode or a speaker that emits audio through aperture 1214 in the eraser end 1206 of the stylus 1200. The audio may be outside the frequency range audible to humans (20-20000 Hz) so as not to disturb the user or those nearby.

In this aspect, the computing device 200 may be configured to detect the light or audio, for example, using an optical sensor or microphone, and identify when the eraser end 1206 is being used thereby identifying that the stylus 1200 is in an erase mode.

Figure 13:
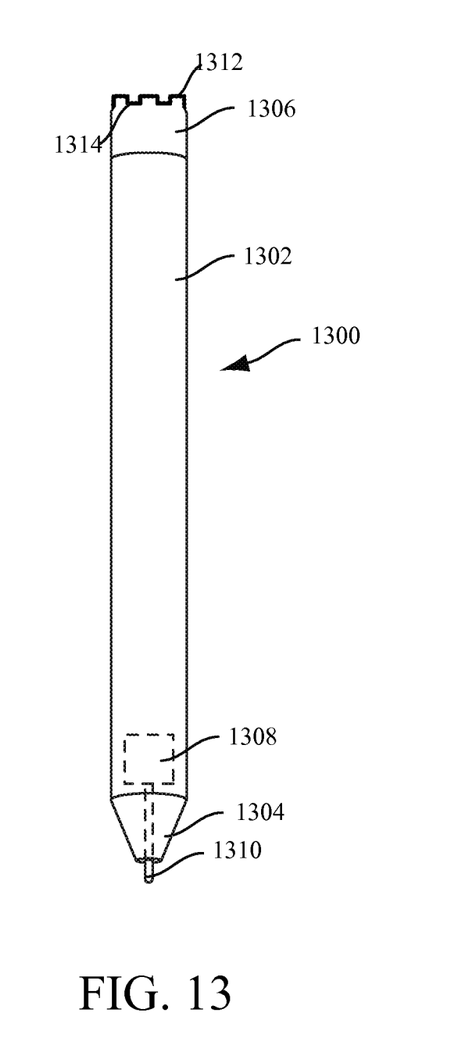

FIG. 13 illustrates yet another type of stylus device. In this aspect, a stylus 1300 includes a body or shaft 1302, an active end 1304, and an eraser end 1306. The active end 1304 may be an active type stylus and include an active sensor 1308 in electrical communication with a tip 1310. In this aspect, the eraser end 1306 includes a multipoint surface feature. As illustrated, the eraser end 1306 includes one or more protrusions 1312 and recesses 1314.

In this aspect, the computing device 200 includes programming instructions that enable the computing device 200 to detect the surface features 1312/1314 of the eraser end 1306 and identify that the stylus 1300 is being used in eraser mode. For example, the computing device 200 may detect that there are three points of contact (between the eraser end 1306 and the touchscreen of the computing device 200) in close proximity to one another or in a particular shaped pattern that is recognized by the device 200 to be an eraser end 1306 end of a stylus. Based on the number of points of contact and their proximity and/or arrangement, the computing device 200 may recognize that the eraser end 1306 is being used. This type of surface feature detection may also be used by the computing device 200 to detect different types of tips that the user may be using, for example the user may have number of stylus devices that have different tips or interchangeable tips for drawing different types of features, line thicknesses, erasing, etc. This can be used to provide the type of artist set of utensils that include various types of tips for drawing different types of lines and other features. The surface features may also be on a separate standalone eraser type device.

In another aspect, the stylus device may include an optical target, such as a feature or device that can be identified by an optical sensor, on the eraser end. The computing device 200 may then detect the mode of the stylus, for example, using an optical sensor, based on sensing the optical target. Different optical sensors may also be used to identify different types of tips for drawing different types of lines and other features.

The computing device 200 may also include programming instructions for palm recognition for identifying when a user's palm or other part of the hand is touching the touchscreen. The palm recognition may instruct the computing device 200 to disregard the palm or other hand touch of the user and focus on the location of the stylus. This allows a user to rest his/her hand on the touchscreen for stability when using the stylus, without the computing device 200 performing a function or drawing based on this touch of the user's hand.

Figure 14:
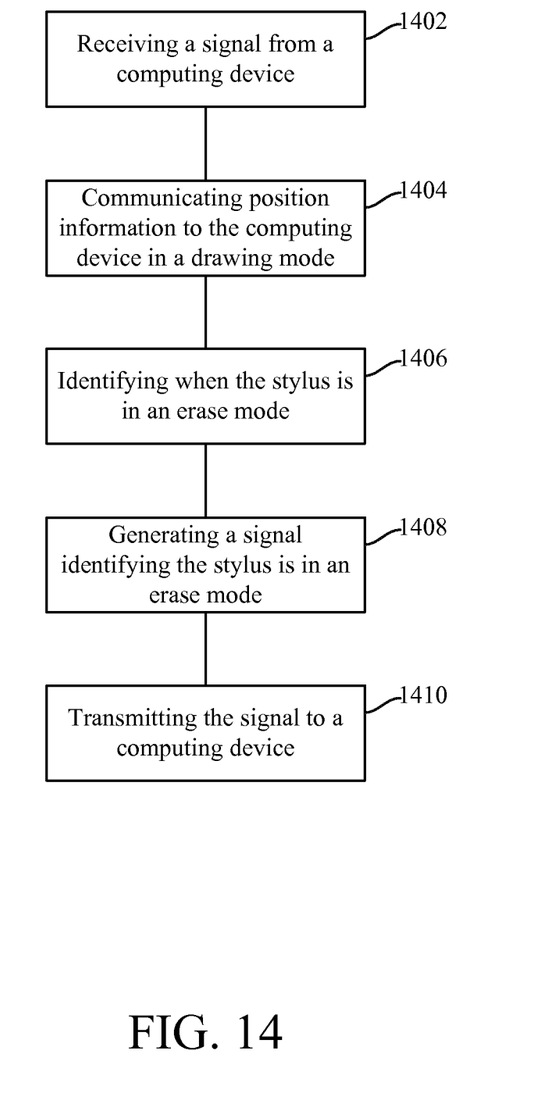
FIG. 14 illustrates a method of operation of the stylus according to one aspect of the present disclosure.

FIG. 14 illustrates a method of operation of the stylus according to an aspect of the present disclosure. The active tip receives a signal from the computing device, illustrated as block 1402. When the stylus is in a drawing or writing mode, the active tip amplifies the signal and communicates position information to the computing device by transmitting the signal back to the computing device, illustrated as block 1404.

When the stylus is turned over and the passive tip or eraser tip is used, the stylus identifies that it is in an erase mode, illustrated as block 1406. The stylus generates a signal containing information of the mode the stylus is in, illustrated as block 1408, and transmits that signal to the computing device, illustrated as block 1410. The stylus may identify the mode using any one or a combination of the features described above, for example, with reference to FIGS. 1-3 and 7-13.

Various aspects, such as, the function of each end of the ends of the stylus devices disclosed herein, also can be implemented in the computing device. These functions may be implemented as one or more scripts or programs written in any programming language, such as Java, C, C# or C++, or any scripting language, such as Perl, Python, or TCL, as well as combinations thereof. The computing device may also communicate with one or more database servers, including without limitation those commercially available from Oracle, Microsoft, Sybase, and IBM.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging, and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. As used in this disclosure, the term "a" or "one" may include one or more items unless specifically stated otherwise. Further, the phrase "based on" is intended to mean "based at least in part on" unless specifically stated otherwise.

What is claimed is:

1. A stylus device capable of communicating with a computing device, the stylus device comprising:
   a body;

a first tip for using with a writing or drawing function on a computing device and disposed at a first end of the body, the first tip including:
   a sensor configured to receive a signal generated by the computing device when the first tip is in contact with a touchscreen of the computing device, wherein contact between the first tip and the touchscreen results in a first conductance,
   first circuitry configured to determine X-Y coordinate information of the first tip relative to the computing device in response to the first tip being in contact with the touchscreen, wherein the circuitry uses the received signal to determine the X-Y coordinate information, and configured to communicate the X-Y coordinate information to the computing device;
a second tip for using with an erase function of the computing device and disposed at a second end of the body opposite the first end, the second tip configured to interact with the touchscreen of the computing device without determining coordinate information of the second tip relative to the computing device, wherein contact between the second tip and the touchscreen results in a second conductance different from the first conductance; and
second circuitry disposed in the body and configured to:
   detect the second tip being used based at least in part on the second conductance being detected by the stylus device, and
   transmit a signal to the computing device indicating that contact between the stylus device and the touchscreen is for the erase function, wherein the transmitting is in response to detecting the second tip being used.

2. The stylus device of claim 1, wherein the second circuitry detects the second tip is being used based on the sensor in the second tip detecting an optical signal of the computing device or an audio signal of the computing device.

3. A stylus device, comprising:
a body;
a first tip disposed at a first end of the body, the first tip configured to receive a signal from a computing device;
a second tip disposed at a second end of the body opposite the first end, the second tip having a particular conductance associated with contact between the second tip and a screen of the computing device, the second tip configured to be used with an erase function of the computing device; and
circuitry configured to:
   detect that the second tip is being used in response to detecting the particular conductance, and
   transmit an indication to the computing device that contact between the stylus device and the computing device is for the erase function.

4. The stylus device of claim 3, wherein the circuitry is further configured to:
determine coordinate information of the first tip relative to the screen of the computing device in response to the first tip being in contact with the screen, wherein the circuitry uses the received signal to determine the coordinate information; and
transmit the coordinate information.

5. The stylus device of claim 3, further comprising a pressure sensitive switch disposed in the body proximate to the second tip and electrically coupled to the circuitry, wherein the circuitry is further configured to transmit the indication in response to activation of the pressure sensitive switch.

6. The stylus device of claim 3, further comprising an optical sensor disposed in the body proximate to the second tip and electrically coupled to the circuitry, the optical sensor adapted to transmit a signal to the circuitry in response to detecting light from the screen of the computing device, and wherein the circuitry is further configured to transmit the indication in response to the signal received from the optical sensor.

7. The stylus device of claim 3, further comprising at least one of an audio source or a light source disposed in the body, wherein the audio source or the light source is configured to emit a signal that identifies that the second tip is facing the computing device.

8. The stylus device of claim 3, wherein the second tip further includes a multi-point surface feature for use in identifying when the second tip is in contact with the screen.

9. A computing device, comprising:
at least one processor;
a touchscreen coupled to the at least one processor; and
a memory device coupled to the at least one processor and including instructions operable to be executed by the at least one processor to perform a set of actions, configuring the at least one processor:
   to receive position information from a stylus when a first end of the stylus is in contact with the touchscreen, the position information comprising information regarding a position of the first end of the stylus relative to the touchscreen of the computing device;
   to cause a drawing mode to be active in response to the first end of the stylus being in contact with the touchscreen;
   to receive an indication from the stylus indicating that a second end of the stylus is in contact with the touchscreen in response to the stylus detecting a particular conductance associated with contact between the second end and the touchscreen; and
   to cause an erase mode to be active in response to receiving the indication that the second end of the stylus is in contact with the touchscreen.

10. The computing device of claim 9, further comprising an optical sensor, and wherein the at least one processor is further configured to cause the erase mode to be active in response to the optical sensor detecting light emitted by the stylus.

11. The computing device of claim 9, further comprising an audio sensor, and wherein the at least one processor is further configured to cause the erase mode to be active in response to the audio sensor detecting an audio signal emitted by the stylus.

12. The computing device of claim 9, wherein the at least one processor is further configured to cause the erase mode to be active in response to the touchscreen detecting a multi-point surface feature on the second end of the stylus being in contact with the touchscreen.

13. A method of operation of a stylus device, comprising:
receiving a signal from a screen of a computing device;
calculating coordinate information of a first end of the stylus device relative to the screen of the computing device in response to the first end being in contact with the screen, wherein the calculating is based at least in part on the received signal;
transmitting the coordinate information to the computing device in response to the first end being in contact with the screen;
detecting a particular conductance associated with contact between a second end of the stylus device and the screen;
determining that the second end is in contact with the screen in response to detecting the particular conductance; and instructing the computing device to activate an erase mode in response to the second end of the stylus device being in contact with the screen.

14. The method of claim 13, wherein the detecting the particular conductance differs from a second conductance resulting from contact between the first end and the screen.

15. The method of claim 13, wherein the determining further comprises detecting a strength of the signal being stronger proximate to the second end than to the first end.

16. The method of claim 13, wherein the determining further comprises detecting an activation of a pressure sensitive switch at the second end.

17. The method of claim 13, wherein the determining further comprises detecting light emanating from the screen, wherein the light is received at the second end.

18. The method of claim 13, wherein the signal comprises an audio signal, wherein the audio signal is received at the second end.

* * * * *